United States Patent [19]

Bufferd et al.

[11] Patent Number: 5,706,330
[45] Date of Patent: Jan. 6, 1998

[54] METHOD AND APPARATUS FOR TRACKING AND TRANSMITTING COMMUNICATION INFORMATION FOR WIRELESS COMMUNICATION SYSTEMS

[76] Inventors: Cary Bufferd, 19657 Waters End Dr., Boca Raton, Fla. 33434; Rick Harris, 5527 E. Janice Way, Scottsdale, Ariz. 85254

[21] Appl. No.: 390,921

[22] Filed: Feb. 14, 1995

[51] Int. Cl.[6] ............... H04Q 7/24; H04Q 7/36; H04Q 7/38

[52] U.S. Cl. ............... 379/58; 379/59; 379/60; 379/114; 455/33.1; 455/33.2

[58] Field of Search ............... 379/114, 144, 379/91, 58, 59, 60, 115; 455/33.1, 33.2

[56] References Cited

U.S. PATENT DOCUMENTS

| | | | |
|---|---|---|---|
| 4,860,336 | 8/1989 | D'Avello et al. | 379/91 |
| 5,233,642 | 8/1993 | Renton | 379/58 |
| 5,377,256 | 12/1994 | Franklin et al. | 379/63 |
| 5,434,920 | 7/1995 | Cox et al. | 380/49 |

Primary Examiner—Dwayne Bost
Assistant Examiner—Nay Maung
Attorney, Agent, or Firm—Longacre & White

[57] ABSTRACT

A communications accounting system is provided wherein the transfer of call detail record information from a remotely located phone may be accomplished in an efficient manner. During non-billable processes or during airtime billed at a reduced rate, the call detail record (CDR) information from the previous registration is simultaneously sent to the collector system for processing to the billing system. More specifically, encrypted and compressed authorization information and call details records (CDRs) from the previous use of the phone are simultaneously communicated from the Cellular Call Computer—Programmable Off-line (C3PO) to the host computer system by modem or other suitable manner. At the validation server, the authorization information is decrypted and uncompressed and stripped away from the CDRs, while the call is live, and sent to an authorization service. While the validation system is working on completing the authorization, the system is uploading the CDRs from calls made since the last authorization attempt. These CDRs are stored for later processing. The invention also provides a roaming management system integrated with the accounting system. By the method of the instant invention, equipment is efficiently utilized, internal airtime charges are minimized, and customers are billed in a timely manner.

15 Claims, 5 Drawing Sheets

METHOD AND APPARATUS FOR TRACKING AND TRANSMITTING COMMUNICATION INFORMATION FOR WIRELESS COMMUNICATION SYSTEMS

BACKGROUND OF THE INVENTION a) Field of the Invention

This invention relates to an accounting system to track the location and usage of wireless communication systems, e.g. cellular phones, particularly those mounted in remote or mobile locations, and to provide an automatic accounting system for centralized record keeping of audit or account statements. The communication accounting system is particularly useful for rental of cellular phones where mobility of the phone presents unique problems in customer billing and accounting for the location and billing records of the telephone unit. Significantly, the accounting system provides a method for transmitting call data to a central computer in an efficient and cost-saving manner.

b) Description of Related Art

Existing commercial cellular phones are generally sold to a user/owner, therefore detailed accounting schemes have been avoided in part to minimize complications with the already complicated requirements for crediting national or international communication carriers, local or regional carriers, and one or more cellular network area operators. Similarly, with multiple charges from multiple carriers and with services provided in a variety of governmental jurisdictions, tax accounting becomes a complex endeavor. With the factor of periodic use by a series of multiple users added, problems arise that cannot be resolved solely by programing changes in existing telephone units or central communication systems. Although other cellular telephone rental systems have been proposed, they have been unable to provide the full features required for proper monitoring of the location and usage of a mobile telephone unit to allow adequate flexibility in setting usage criteria and retrieval of call detail records for appropriate charge schedules.

Moreover, current data retrieval systems unnecessarily tie up costly air time during transmission of call data report information from a remote location to a central billing location.

When a rental car is equipped with a cellular telephone, cellular telephone usage may need to be determined in order for the rental agency to accurately bill the rental customer for the usage of the cellular telephone. It is inconvenient and economically impractical for the rental agency to wait for the end of the month to receive the cellular telephone usage report from the cellular telephone company, and then from that report to charge the rental customer for the usage of the cellular telephone. Cellular telephone usage must be calculated quickly and accurately so that the rental agency can correctly charge the rental customer for the usage of the cellular telephone. If a cellular telephone by itself is rented, then usage of the cellular telephone may also need to be monitored so that proper rental rates can be calculated by the rental agency.

Since a cellular telephone has airtime charges which are incurred whenever the telephone is used, both for outbound and incoming calls, the usage of the cellular telephone for both incoming and outbound calls must be monitored. A system to monitor cellular telephone usage must record the date and time of the start of any telephone call, either incoming to the cellular telephone or outbound from the cellular telephone, the duration of the telephone call, an indication that a particular call was incoming or outbound, any digits which were dialed to place an outbound cellular telephone call, and any special billing factors that were created; such as roaming charges. This information is needed in order to accurately monitor cellular telephone usage. In the case of a telephone which is rented and for which a billing must be created based upon usage of the cellular telephone, the bill for the rental customer can be calculated based upon this information. This information must also be known if a printout or computer record which provides a record of the cellular telephone usage is to be created.

U.S. Pat. No. 5,233,642 to Renton, which is incorporated herein by reference, discloses a means of monitoring the usage of a mobile cellular telephone and providing information relating to that usage. The Renton patent teaches a removable memory device that may be extracted from the mobile telephone unit, and taken to a stationary unit which reads information from the memory device; thereby transferring the call detail records to a computer for evaluation. By way of an alternate embodiment, the information stored in the memory device may be transferred from the memory to a central computer via a radio link or a data modem. These methods however are inefficient and time consuming, because each memory device must be periodically removed from the telephone unit in order to download the call detail record information. The alternate embodiment ties up airtime unnecessarily as call detail record information is communicated to the central computer via a dedicated call. Using the invention of the Renton patent, a company's internal air time charges unnecessarily accrue during data transfer.

A practical means for monitoring the usage of wireless communication systems is needed in order to provide a means by which the usage of the communications systems can quickly and easily be determined, so that evaluation or billing based upon the usage of the communications system can practically be accomplished in an automated manner without incurring unnecessary airtime charges.

SUMMARY OF THE INVENTION

The accounting system of this invention solves the problems in expanding the capability of existing communications systems by improvements in software programming and hardware additions, which are preferably integrated into a composite system that is useful for small and large organizations.

By the instant invention, the transfer of call detail record information from a remotely located phone may be accomplished during available air time which is not billable or is billable at a reduced rate, i.e. during authorization or maintenance airtime.

For example, during a pre-authorization process, when a customer's credit card information is transmitted to the collector system for validation, the call detail record (CDR) information from the previous registration is simultaneously sent to the collector system for processing by the billing system. More specifically, encrypted and compressed credit card data and call details records (CDRs) from the previous use of the phone are simultaneously communicated from the Cellular Call Computer—Programmable Off-line (C3PO) to the host computer system by modem. At the validation server, the credit card data is decrypted and uncompressed and stripped away from the CDRs, while the call is live, and sent to a credit card usage authorization service. While the validation system is working on completing the authorization, the system uploads the CDRs from calls made since the last authorization attempt. These CDRs are stored for later processing.

In the alternative, information may similarly be transmitted to the remote phone unit from the host computer during available airtime which is not billable or billable at a reduced rate. Specifically, reprogramming information may be simultaneously transmitted with maintenance information to the remote phone unit to improve data transfer efficiency.

By the method of the instant invention, equipment is efficiently utilized, internal airtime charges are minimized, and customers are billed in a timely manner.

DETAILED DESCRIPTION OF THE INVENTION

The preferred embodiment of the invention will now be described with reference to the accompanying drawings. While the description that follows primarily references cellular telephone communications systems, it to be understood that the spirit and scope of the invention is intended to encompass all wireless communications systems wherein system use results in billable airtime.

With reference to the cellular phone system envisioned by the invention, the invention comprises a mobile unit which generates and collects call detail record information relating to usage of a cellular transceiver, a stationary or central collection unit which evaluates the call detail record (CDR) information, and a communication interface which transfers the call detail record information from the mobile unit to the stationary unit. The communications interface is preferably a radio link or data modem for transferring CDR data via the cellular transceiver.

When not in use, the cellular phone handset is "locked" in the credit card validation module (CRVM) in an "off-power" condition. Upon successful pre-authorization of a customer credit card, the cellular phone handset is "unlocked" or released from the CRVM for use by the customer, and switched to an "on-power" condition.

Figure 3:
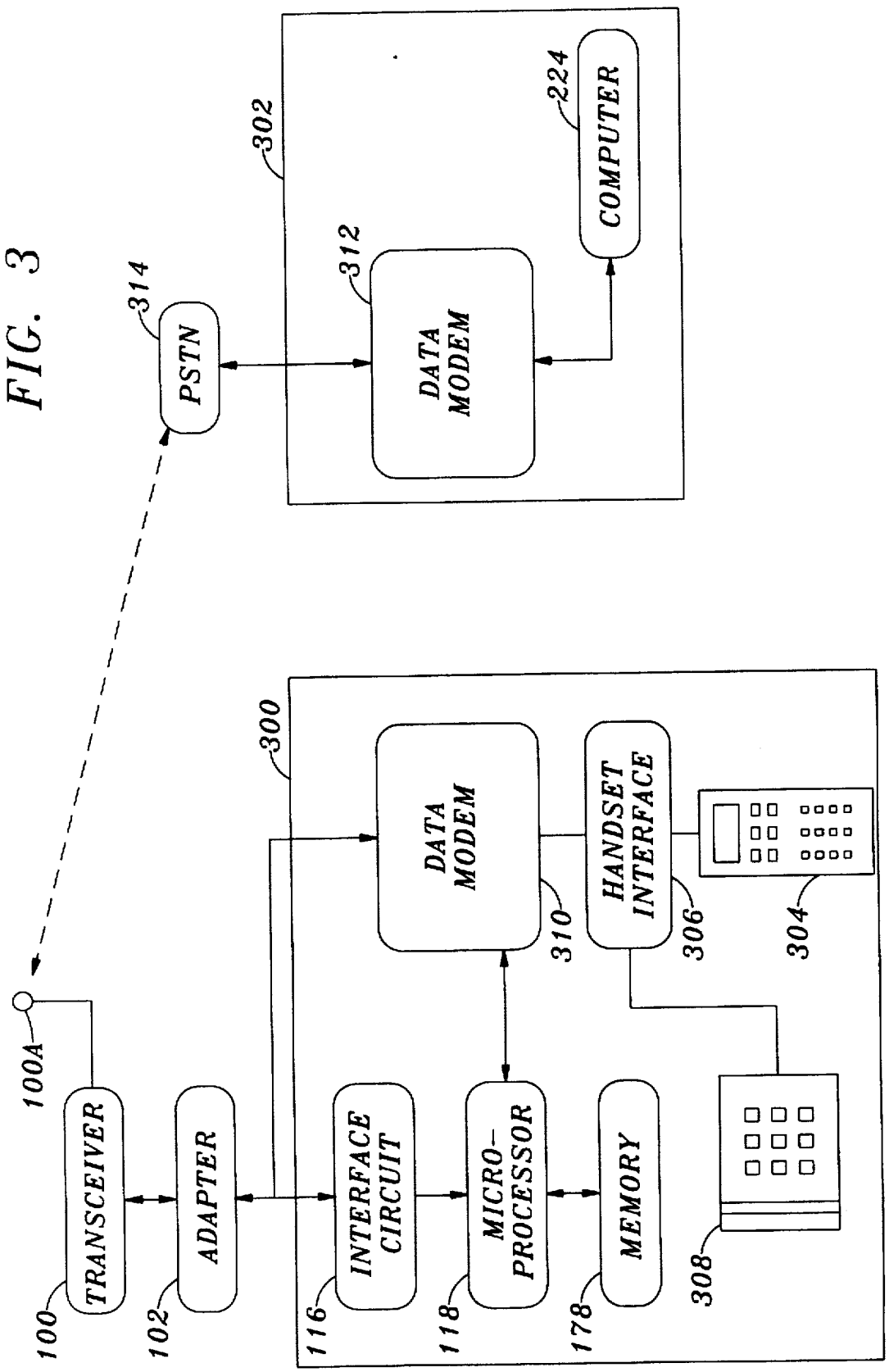
FIG. 3 is the preferred embodiment of the hardware of the present invention in which call detail record information is transferred from a remote memory location to a central collector via a modem.

With reference to FIG. 3, the credit card billing system of the invention is essentially a large database. Stationary database 302 receives call record details from a Cellular Call Computer—Programmable Off-line (C3PO) 300 which is comprised of a cellular handset 304, handset interface 306, and a credit card validation module (CRVM) 308. The billing data is temporarily stored by C3PO 300 for later transmission to the collector system.

Figure 5:
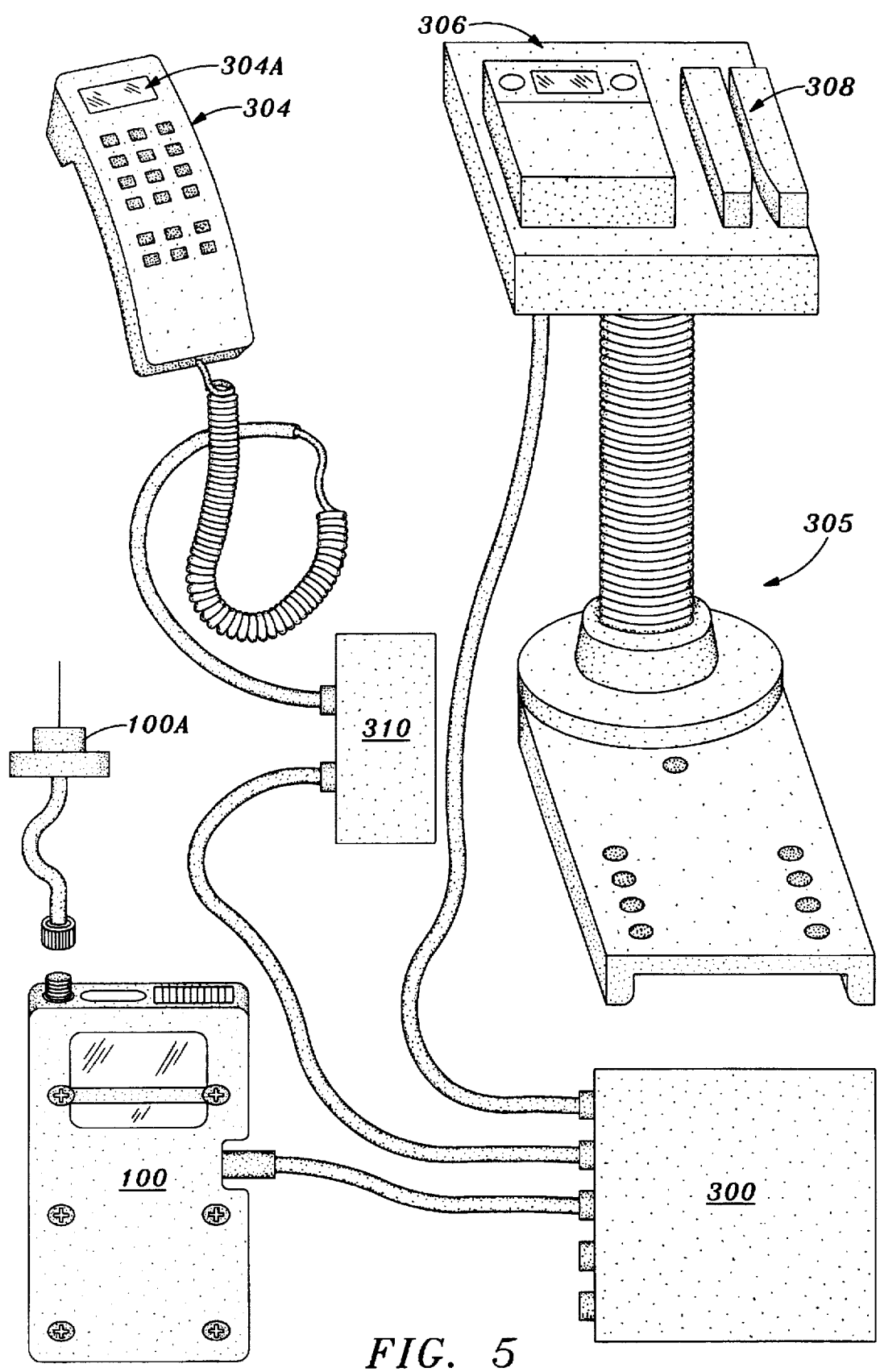
FIG. 5 is an illustration of one design for the hardware of the C3PO and mobile communication unit which is suitable for mounting within an automobile.

FIG. 5 is an illustration of the hardware of the C3PO and mobile communication unit which is suitable for mounting within an automobile. As illustrated, the handset interface 306 and credit card validation module 308 are provided on an adjustable based member 305 suitable for mounting within an automobile. The handset 304 is designed to be received and "locked" onto the handset interface 306. The data modem 310, microprocessor 118 and memory 178 are appropriately mounted at another location of the vehicle where space is available, for instance, the trunk. The transceiver 100 is also provided with an antenna 100a which may be mounted to the exterior of the vehicle.

The collector system or stationary unit 302 reliably receives and transmits data from all remotely located C3POs 300. Basic to the functionality of the collection system 302 is its ability to connect to a C3PO and accurately exchange information. With the present invention, the C3PO 300 will call in or connect to the collector system 302 in one of the following instances:

Registration when a new customer wants to use a phone, or a current customer has been required to re-register;

Diagnostic failure when the phone has detected a problem;

Maintenance action when a service person has initiated a call to send installation, repair, or movement data to the phone;

Timeout check-in when the phone has not been used for a predetermined period of time and needs to send in call detail record information, or merely check-in;

Roaming call-in when the phone detects a roaming state and calls in to the collector system 302; and Activation of preprogrammed buttons when the customer has depressed one of the external handset buttons for special functions, i.e., emergency response, customer service.

At the time the phone calls in, the collector system will determine the exact reasons for the call and take appropriate action.

Figure 1:
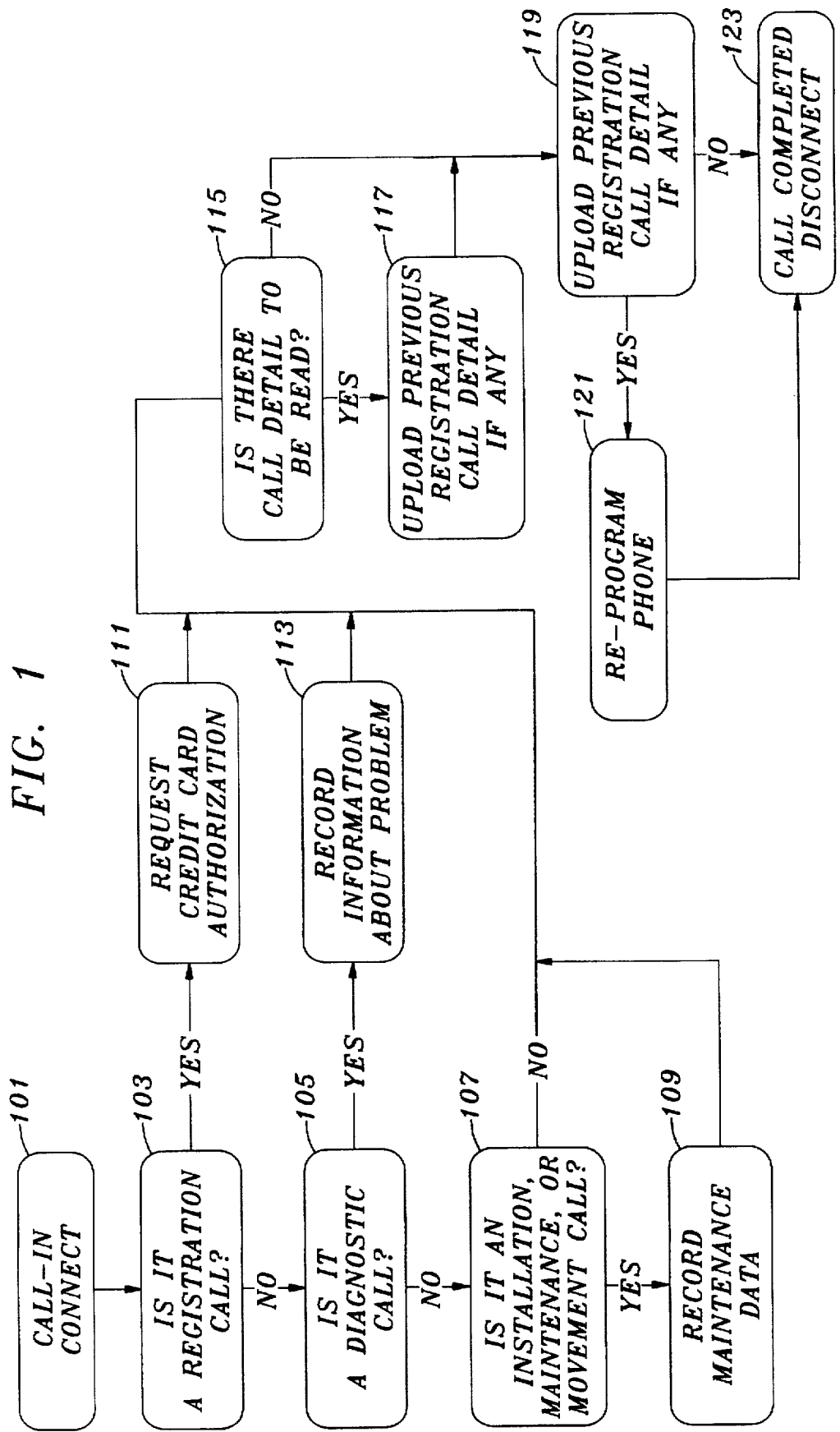
FIG. 1 is a flow-chart of the basic steps taken when a phone calls in to the collector system.

FIG. 1 provides a flow-chart of the basic steps taken when a phone calls in to the collector system 302. At block 101, call-in connection is made. At block 103, the collector unit 302 determined if the call is a registration or authorization call. If yes, the collector proceeds with the credit card authorization process at block 111. From block 111, the system determines whether call detail records (CDRs) are being transmitted with the, authorization data (block 115). If there are CDRs to be read, the collector uploads all stored CDRs (block 117) and moves to block 119. If there are no CDRs at block 115, the system proceeds to block 119 to determine if the phone unit is to be reprogrammed. If yes, the phone is reprogrammed (block 121), then the call is disconnected (block 123). If no, the call is disconnected (block 123).

If the response at block 103 is no, the collector proceeds to block 105 where the collector determine if a diagnostiac call is being made. If yes, the collector proceeds to block 113 where diagnostic information is recorded by the collector 302. The collector then proceeds to block 115 and follows the procedure set forth above.

If the response at block 105 is no, the collector proceeds to block 107 where the collector determines if an installation, maintenance or movement call is being made. If yes, the system records the maintenance data (block 109), and proceeds to block 115. If no, the system proceeds directly to block 115.

Particularly for cellular communications systems, the maintenance call will often initialize the phone unit with necessary installation information. Initial installation must provide information such as date and time of installation, installer ID telephone number (TN), electronic serial number (ESN), a cellular PIN, and when installed in a vehicle, vehicle identification number (VIN), vehicle license number, rental agency information, etc. This information will similarly be updated during maintenance and/or reinstallation.

Pre-authorization is essentially a two-step process. Upon the physical event when a customer swipes a credit card through CRVM 308, the C3PO will perform the first step of pre-authorization. That is, the C3PO will make a determination of essential information, i.e., the card type and expiration date. At this stage the C3PO 300 determines if the card is valid and is the type of card accepted by the communication system. If the C3PO determine at the outset that the card is not acceptable, validation is refused.

Significantly, the transceiver 100 remains in the "off-power" condition during the entire first stage of pre-authorization. This first validation step precludes the usage of billable airtime in the event a card is invalid.

If the C3PO determines that the card is preliminarily acceptable, the transceiver 100 is switched to the "on-power" condition and places a registration or authorization call to the collector system 302. At this stage, the credit card information is transmitted to the collector system 302.

At this point, the collector system performs the second step of credit card pre-authorization. The mobile phone unit or C3PO 300, which has placed a call to the collector system 302, forwards the information obtained from the credit card as it was swiped through the credit card reader 308. The collector system 302 then forwards the appropriate pre-authorization request to the appropriate credit card company.

During the swipe of the customer's credit card through the card reader 308, the card reader 308 reads information off all tracks of the magnetic strip on the back of the card. Data includes the card number, card expiration date, customer name, etc. This data must be sent from the C3PO to the collector system to ensure validation and billing data integrity. Once the pre-authorization data has been received by the collector, it is sent to the appropriate credit card validation company, i.e., AMEX or CES, for pre-authorization approval. Once the credit card validation company has processed the credit card information, the acceptance or denial is sent to the collector 302. If acceptance is received, the collector system then "unlocks" the phone handset 304 from the handset interface 306 for usage.

If the credit card is denied, the collector system so indicates and the phone handset 304 remains in the "locked" condition. A non-validation database is utilized to record all requests for service that are denied by the credit card approval company. This database is useful to determine and track unauthorized credit card usage attempts by card or person.

The Cellular Call Computer—Programmable Off-line (C3PO) incorporates a credit card reader 308 which is used to capture the phone user's credit card information. After preliminary validation of the credit card type and expiration date by the C3PO 300, the C3PO 300 places a call over the cellular system through the public switching telephone network (PSTN) 314 to the host validation server computer system 302.

As previously mentioned, the C3PO 302 is designed to minimize those instances when the transceiver 100 is in the "on-power" condition. Specifically, the transceiver 100 remains in the "off-power" condition until the user either swipes an approved card through the card reader 308, or initiates an emergency call (911). An emergency call is immediately approved in accordance with industry standards. When a customer swipes a credit card through the reader 308, the system follows the procedure outlined above.

The aforementioned "off-power" provision is an anti-fraud measure to prevent cloning of the phone data. Normal operating characteristics of a cellular mobile system requires that the electronic serial number (ESN) and (NAM) are transmitted on a regular interval, e.g., every 15 seconds. This intermittent transmission allows the local carrier to identify that the phone is active on the system. The regular interval transmission is responsible for the ability to monitor by electronic means the ESN and NAM with the use of a wireless receiver. Thus, an unauthorized party may defraud the cellular user by remotely capturing this ESN and NAM during these periodic transmissions. This information may later be reprogrammed into an unauthorized cellular phone; a process referred to as "cloning".

Initial card screening based on the card type, expiration date, etc. done at the mobile system, or C3PO, allows the transceiver 100 to be powered or switched to the "on-power" condition only when required. This provision helps manage fraud resulting from the cloning by allowing transmission of the ESN and NAM only when required.

Significant to this invention is the downloading of previously stored information during non-billable airtime or airtime billed at a reduced rate, for example, during the previously described pre-authorization sequence. That is, during the pre-authorization process, the call detail record (CDR) information from the previous registration is sent to the collector system 302 for processing to the billing system. Encrypted and compressed credit card data and call details records (CDRs) from the previous use of the phone are communicated from the Cellular Call Computer—Programmable Off-line (C3PO) to the host computer system by modem 310. At the validation server or collector 302, the credit card data is decrypted and uncompressed and stripped away from the CDRs, while the call is live, and sent to a credit card usage authorization service. While the validation system is working on completing the authorization, the system is uploading the CDRs from calls made since the last authorization attempt. These CDRs are stored for later processing.

When the authorization request is complete, the host system 302 sends a response to the C3PO 300 indicating whether the card is accepted or denied for use.

In certain circumstances, the C3PO unit 300 will originate a call to the host computer to transfer CDRs when a programmable period of time has elapsed and no authorization request has been made. For example, when a particular phone unit goes unused for a set period of time, e.g. 24 hrs., the C3PO will originate a call to the host computer to transfer CDRs stored by the C3PO; CDRS corresponding to the most recent customer's usage information. This alternate provision protects the accounting system from losing CDR information when a particular C3PO is out-of-service or goes unused for an extended period of time.

The collector system 302 marks the individual CDRs in the C3PO as successfully transferred only when the transmission protocol indicates that a successful completed communication has occurred.

To effectively utilize the phone's capabilities and limit the real time requirements of technicians in the field, the capability of remote reprogramming is required. To complete this task, the collector system, working with inventory and maintenance systems, is provided with the capability to poll and interrogate individual phone sets to determine if the phone is operating correctly. Thus, the C3PO is provided with a wake-up capability, whereby during non-use (off-hours) the collector system 302 calls individual C3PO units for diagnostic purposes. If the phone unit is "in use" or busy, the collector system is programmed to try again at a later time.

Whenever a phone encompassed by this invention is polled, diagnostics may be remotely performed. When the collector system requests these diagnostics, the results may be retrieved and stored for real time and/or future analysis.

With this invention, the phone performs self-diagnostics whenever not in use by the customer. Whenever the phone determines that it is not capable of performing its duties, or when marginal errors are detected, the phone calls in to the collector system and reports its condition.

It should be noted that maintenance calls can be classified in two distinct categories; first, when service is being provided to the mobile phone unit 304 or C3PO 302; and second, when CDR information is being harvested in order to avoid stale call detail records.

Under ordinary circumstances, there are two types of cellular connections. The first is the incoming and/or terminating connection when someone is calling the phone, and the second is the outgoing and/or originating connection when the phone is utilized to call another number. When either type of connection is made, the phone must be able to store related call data for billing the connection. This data will later be collected by the billing system to be processed.

Incoming calls are calls destined for the cellular phone. There are two categories of incoming calls: (1) billed and (2) maintenance. Billed calls are completed only after the phone has been unlocked by an accepted credited card swipe with time remaining after the pre-authorization. Detailed information must be kept on a per-call basis, and includes: calling number, called number, start time, end time, call duration, roaming or SID area. This data is required in order to bill the airtime to the customer's credit card. Maintenance calls are designed to remotely harvest CDR records, to update cellular software, and/or obtain information about the cellular set, for example, if the phone has been inoperative for a predetermined period of time, e.g. 24 hours.

Completion of customer-dialed or outgoing calls is achieved after successful pre-authorization and "unlocking" of the phone handset. Once a customer has authorization to utilize the phone, calls are made subject to the limits placed on the caller by the central computer. That is, the customer will likely be subject to limits to protect the system against fraud. These limits include maximum air time without re-authorization, maximum charges actually billed to the customer's credit card, among others.

Figure 2:
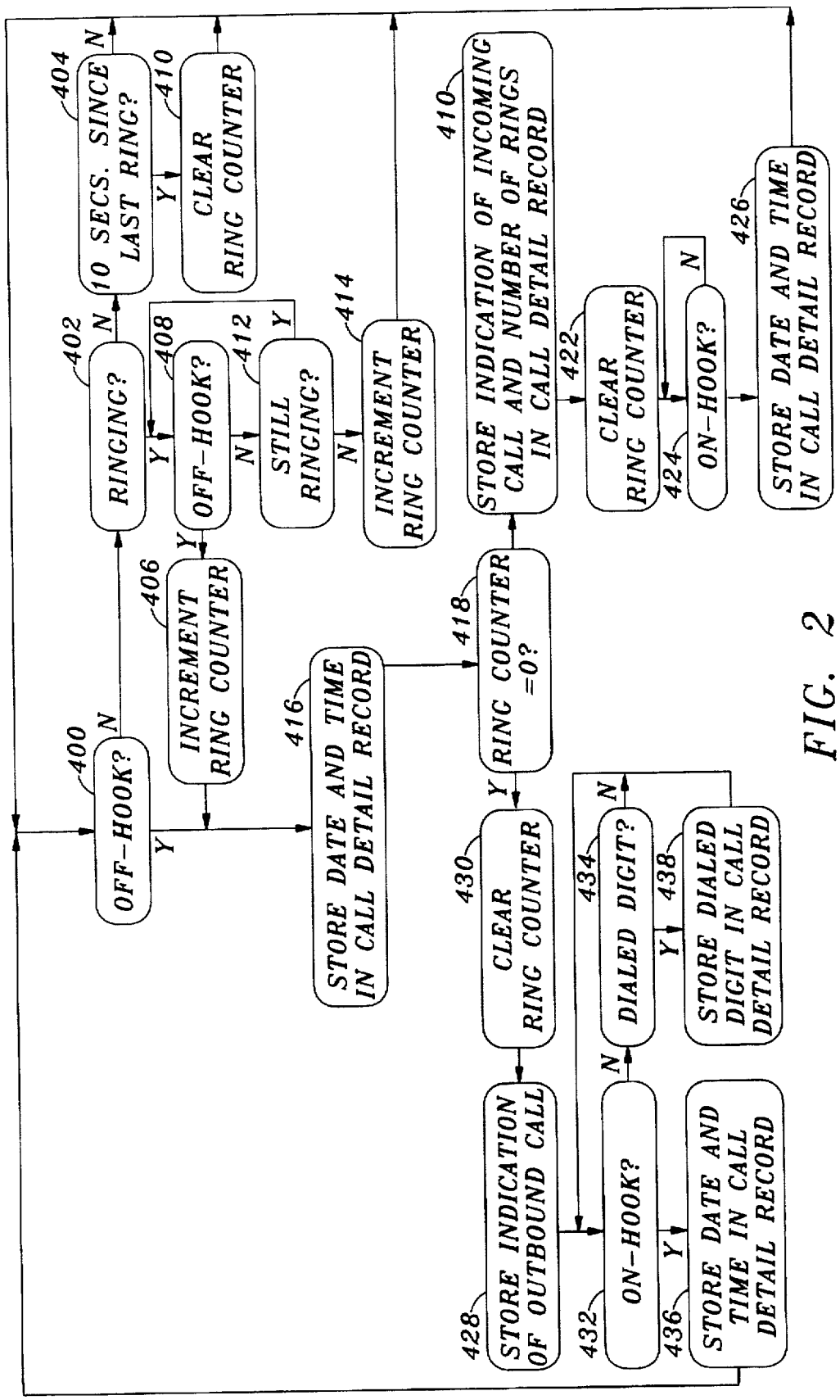
FIG. 2 is a flow chart diagram of the steps taken to generate call detail records for both incoming and outbound calls.

FIG. 2 presents a flow chart diagram of the steps taken to generate call detail records for both incoming and outbound calls. The generation of a call record for an incoming telephone call consists of detecting the ringing of an incoming telephone call (blocks 402–414), detecting the change of state from an on-hook to an off-hook condition (blocks 400 and 408), recording the date and time of the transition from the on-hook to off-hook condition (block 416), detecting a transition back to the on-hook state from the off-hook state (block 424), and the storing in the microprocessor memory 178 (see FIG. 3) information reflecting the date and time of the transition from the on-hook state to the off-hook state (block 416) along with the duration of time for which the telephone device remained off-hook or the date and time at which the transition is made back to the on-hook condition from an off-hook condition (block 426), along with an indication that a telephone call was incoming (block 420). These steps are performed by the microprocessor 118 through the use of an analog-to-digital converter to detect the on-hook and off-hook states and the ringing signal, and through the use of the real-time clock to accurately determine the date and time of the start and end of the telephone call, as described above. The call record information is stored in the memory 178 of the microprocessor 118 for retrieval at a later time.

When the microprocessor 118 detects a transition from the on-hook to off-hook condition (blocks 400 and 408) the date and time of the transition are stored in the microprocessor memory 178. The ring counter variable is read (block 418), and, if not zero, the number of rings is stored as a part of the call record (block 420), along with an indication in the call record which shows that the call is an incoming call (block 420). The microprocessor 118 then monitors the incoming telephone call and waits for the transition from the off-hook condition back to the on-hook condition (block 424). When this occurs, the microprocessor 118 reads the real-time clock and stores the time at which this transition occurred (block 426). The call detail record now has been recorded in the memory 178 of the microprocessor 118, and contains the date and time of the initiation of the call, an indication that a call was incoming and how many rings occurred before the call was answered, and the date and time of the end of the call. This information provides the usage information for the cellular transceiver 100 when an incoming call is received.

The generation of a call record for an outbound telephone call consists of the detection of the transition from an on-hook to an off-hook condition (block 400), recording the date and time of the transition from the on-hook to the off-hook state (block 416), recording the dialed digits used to place the telephone call (block 438), monitoring the voltage and detecting the transition from an off-hook state to an on-hook state (block 432), recording the date and time of the transition back to the on-hook state from the off-hook state (block 436), and the storage in the microprocessor memory 178 information reflecting the date and time of the transition from the on-hook state to the off-hook state (block 416) along with the duration of time for which the telephone remained off-hook or the date and time at which the transition from the off-hook state to the on-hook state is made (block 436), and further storing in the microprocessor memory 178 information relating to the dialed digits used to place the telephone call (block 438). As shown above, each of these steps can be accomplished through the use of the analog-to-digital converter and a dual-tone multi-frequency (DTMF) decoder IC when coupled with the microprocessor 118 and its memory 178. As in the generation of the call record for the incoming call, the outbound call record generation uses the analog-to-digital converter to detect the transitions to the on-hook and off-hook states. However, the ring counter variable will indicate that the call is outbound by the ring counter variable having a value of zero (block 418).

The microprocessor 118 monitors incoming telephone calls for the transition from the off-hook state to the on-hook state (block 432), while also monitoring a data available signal line from the DTMF decoder IC (block 434) and collecting and storing in its memory any digits which are dialed (block 438). When the microprocessor 118 detects the transition back to the on-hook state (block 432), the date and time of the transition is read from the real-time clock 206 and is stored in the call detail record (block 436). This provides a call detail record which contains the date and time of the initiation of an outbound call, any dialed digits used to place the telephone call, and the date and time of the termination of the outbound telephone call. This provides the usage information when the cellular transceiver 100 is used for an outbound call. While the foregoing description provides one analysis for the generation of call detail record information, it is to be understood that the spirit and scope of the invention is not to be limited to this description, but may encompass any suitable method for generating accurate CDR information.

An evaluation portion of the collector system of the host computer can contain very complex evaluation based on the type of call, time of day or week of the call, and the duration of the call. When the invention is used with an evaluation program in the computer which creates a billing for usage of the cellular transceiver, the billing can include different charges for different types of calls including different charges for local or long distance calls, different rates per minute for different types of long distance calls based on the area code of an outbound call so as to accurately reflect the actual costs of such calls, the inclusion of special variables so as to allow no-charge usage of the cellular transceiver to call emergency or information numbers, variables to allow a call to a specific telephone number or area code with no charge, variables to provide special billing functions so as to allow no-charge usage of the cellular telephone to call specific numbers or for specific amounts of time, and many other alterations and additions to the billing evaluation and computation which will become apparent to one skilled in the art. The program in the computer which provides the evaluation and billing of such calls is independent of the microprocessor program, so changes to the billing evaluation program can be made without any modification to the microprocessor program in C3PO.

The collector system will now be described with respect to its hardware requirements. The collector system should be designed to allow modular expandability. It basic elements, i.e., network, communications server(s), and the database server(s), need to be designed to handle increasing line requirements, network traffic, and user access.

In addition to efficiently transmitting pre-authorization data to credit card validation companies, the collector system must be capable of evaluating special calls. For instance, the C3PO must determine when emergency (911) calls are made. When a customer depresses a preprogrammed emergency (911) button, information that is required by local 911 systems must be provided. In addition, since the 911 call is non-billable, the information passed to the collector system must so indicate to ensure proper billing. The same is true when customer service is requested through a pre-programmed customer service button provided on the cellular phone.

FIG. 3 shows the preferred embodiment of the hardware of the present invention in which the microprocessor is coupled to a modem which is coupled to the adapter and thereby coupled to the cellular transceiver. The host computer 224 in collector unit 302 is also coupled to a modem 312, which connects to the public switched telephone network 314. The microprocessor transfers data from the memory to computer through modems 310 and 312. A cellular transceiver 100 is coupled to the public switched telephone network 314 via the cellular network (not shown) in the conventional manner. The transfer of the call detail record information from the memory to the host computer may be accomplished with a serial protocol as described above, or may be accomplished with an alternative protocol more suitable for modem data transfers. Such alternative protocols may include Xmodem, Ymodem, Zmodem, CDPD or other such protocols widely known and used in the field of data modem transfers. The call detail record information will be collected from the mobile unit or C3PO unit 300 by host computer 224 in the stationary unit during non-billable airtime, or during airtime billed at a reduced rate, i.e. during pre-authorization. During maintenance operations, the computer may place a telephone call to the mobile unit via modems 312 and 310, the public switched telephone network 314, the cellular network (not shown), cellular transceiver 100, and adaptor 102. The call detail record information of a particular customer will be retrieved from memory and transferred by microprocessor 118 to the computer 224 via modems 310 and 312 during the pre-authorization sequence of the next customer. Alternatively, the microprocessor may initiate a telephone call via modem 310, adaptor 102, the cellular network, and cellular transceiver 100 after a predetermined period of non-use. This telephone call may be answered by modem 312 via public switched telephone network 314.

Because the present invention transfers data during non-billable airtime or when the airtime is billed at a reduced rate, the system of the invention better utilizes the deployed equipment, minimizes internal airtime charges, and provides an efficient method with which to bill customers.

Significant to this invention is the transfer of data during the pre-authorization process. During the pre-authorization process, the customer's credit card information is transmitted to the collector system and the call detail record (CDR) information from the previous registration is simultaneously sent to the collector system for processing. More specifically, encrypted and compressed credit card data and call details records (CDRs) from the previous use of the phone are simultaneously communicated with pre-authorization information from the Cellular Call Computer—Programmable Off-line (C3PO) to the host computer system by modem. At the validation server, the credit card data is decrypted and uncompressed and stripped away from the CDRs, while the call is live, and sent to a credit card usage authorization service. While the validation system is working on completing the authorization, the system is uploading the CDRs from calls made since the last authorization attempt. These CDRs are stored for later processing.

In the alternative, information may similarly be transmitted to the remote phone unit from the host computer during available airtime which is not billable or billable at a reduced rate. Specifically, reprogramming information may be simultaneously transmitted with maintenance information to the remote phone unit to improve data transfer efficiency. The reprogramming information is downloaded to the C3PO 300 and may consist, for example, of display information for the display screen 304a of the phone unit 304. Because the reprogramming information is transmitted simultaneously with, for example, maintenance data, billable airtime is reduced and efficiency is maintained.

The bill tracking and transmitting system of the invention reduces communication charges, and reduces billing errors. By transferring previously stored CDR information during the subsequent pre-authorization request, at least one communication charge is eliminated. Moreover, the mobile phone unit is cleared of previous call data. The invention therefore further reduces the possibility of billing errors by providing for discrete data reports for each customer, or for each authorization request of the same customer.

Figure 4:
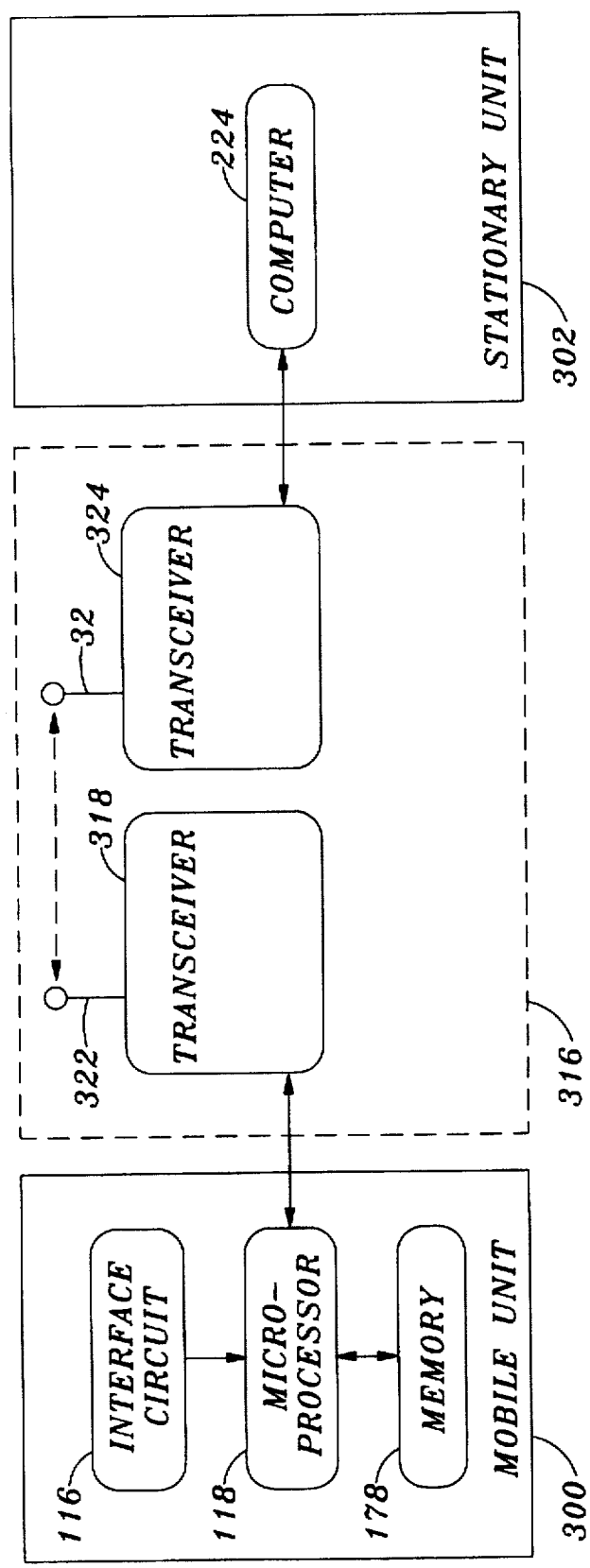
FIG. 4 is an alternate embodiment of the hardware of the present invention in which call detail record information is transferred from a remote memory location to a central collector through a radio link.

Referring to FIG. 4, an alternative embodiment of the invention is shown and features not illustrated are assumed to be identical to those elements previously described. In this alternative embodiment the call detail record information is transferred from memory 178 by the microprocessor 118 through a radio link 316. Radio link 316 comprises transceivers 318 and 324, data modems (not shown) for modulating and demodulating signals for use with transceivers 318 and 324, and antennas 322 and 326. Transceivers 318 and 324 are in radio communication with each other via antennas 322 and 326 in a conventional manner.

Radio link 326 therefore provides a communications interface between the microprocessor 118 and the computer 224 for transfer of authorization information and the call detail record information from the memory 178 to computer 224 in the same manner as described above with reference to FIG. 3. The radio link 316 may be used to allow wireless transfer of the call record detail information. When the invention is used in a rental vehicle equipped with a cellular transceiver 100, it can be highly desirable to transfer the call record detail information from memory 178 to the computer 224 for evaluation without requiring any human intervention. Radio link 316 provides an interface for the transfer of the call detail record information in an automatic fashion under the control of microprocessor 118. The call detail record information may be transferred to computer 224 in a serial fashion as described above, in an alternative protocol as described above, or in an alternative protocol suitable for the transfer of data over radio link 316.

The present invention is also programmed to provide efficient roaming status management. The purpose of roaming status management is to reduce communication costs when a phone unit is out of its home system area. In the event that a mobile communication unit is out of its home system, and roaming for more than a predetermined amount of time, the phone unit or C3PO will then call in to the collector system to acquire a reassigned NAM. The reassigned NAM will be assigned from a reserved pool of numbers and will be linked to that mobile unit's ESN. The new NAM will then be down-loaded to the mobile unit and immediately activated at the new home carrier, i.e. the new home carrier is located in the region to which the mobile unit has roamed. The reassigned NAM will be local to the current home system which is determined by the uploaded site identification number (SID). The SID is used to identify specific cellular carrier systems.

The roaming management system of the invention is integrated into the accounting system to provide an efficient system for determining call detail records and preventing fraud.

From the foregoing description it is clear that the present invention provides a method for tracking and transmitting call detail record information during non-billable airtime or airtime which is billed at a reduced rate, i.e., authorization, without incurring addition airtime charges to the accounting system. Additional safeguards are provided to prevent fraud and to provide customer service and emergency response capabilities. While the foregoing invention has been shown and described with reference to particular hardware and software, it will be understood by those having skill in the art that various changes in form and detail may be made therein without departing from the spirit and scope of the invention.

We claim:

1. A usage monitoring system for monitoring, storing and analyzing the usage of a wireless communications system by at least one customer, comprising:

at least one remote unit including a real time clock generating clock signals, a memory for storing usage data, said usage data being indicative of usage of said communication system, and a microprocessor coupled to said clock and said memory and having a program for processing and storing said usage data;

a collector means for receiving and storing said usage data from said at least one remote unit, said collector means including a computer with memory and an evaluation program, said evaluation program being operative to evaluate said usage data indicative of usage of said communications system; and a communications interface means for communicating transmission information between said at least one remote unit and said collector means, and for transferring said usage information from said memory in said at least one remote unit to said collector means for evaluation by said evaluation program, wherein said communications interface means transfers said usage data simultaneously with said transmission information, and wherein said transmission information comprises authorization data enabling said at least one customer to gain access to said communication system, said authorization data being analyzed in order to meet predetermined authorization criteria established by said communication system, and wherein said usage data is generated by a first customer and said transmission information is generated by a second customer, said first customer and said second customer defining sequential users of said communication system.

2. The system recited in claim 1, wherein transmission information comprises diagnostic data indicating an operating condition of said at least one remote unit.

3. The system recited in claim 1, wherein transmission information comprises maintenance data evaluating an operating condition of said at least one remote unit.

4. The system recited in claim 1, wherein said usage data and said transmission information are encrypted and compressed by said at least one remote unit.

5. The system recited in claim 4, wherein said usage data and said transmission information are decrypted and uncompressed by said collector means.

6. The system recited in claim 1, wherein said at least one remote unit comprises an automatic communication means for automatically communicating with said collector means when said at least one remote unit detects a predetermined condition.

7. The system recited in claim 6, wherein said predetermined condition is a predetermined period of time in which the at least one remote unit is unused.

8. The system recited in claim 6, wherein said predetermined condition is a roaming state, said roaming state occurring when said at least one remote unit is relocated outside a predetermined region.

9. The system recited in claim 6, wherein said at least one remote unit is adapted to perform a self-diagnostic analysis, and said predetermined condition is a diagnostic problem discovered during said self-diagnostic analysis.

10. A usage monitoring system for monitoring, storing and analyzing the usage of a wireless communications system by at least one customer, comprising:

at least one remote unit including a real time clock generating clock signals, a memory for storing usage data and identification data, and a microprocessor coupled to said clock and said memory and having a program for processing and storing said usage data, said usage data being indicative of usage of said communication system and said identification data adapted to uniquely identify said at least one remote unit;

a collector means for receiving and storing said usage data from said at least one remote unit, said collector means including a computer with memory and an evaluation program, said evaluation program being operative to evaluate said usage data indicative of usage of said communications system; and a communications interface means for communicating transmission information between said at least one remote unit and said collector means, and for transferring said usage information from said memory in said at least one remote unit to said collector means for evaluation by said evaluation program, wherein said at least one remote unit further comprises a roaming status means for detecting a roaming status defined by a relocation of said at least one remote unit outside a predetermined communication region; and wherein said communications interface means is transfers said usage data to said collector means simultaneously with said roaming status.

11. The system recited in claim 10, wherein said roaming status is further defined by said relocation continuing for more than a predetermined period of time.

12. The system recited in claim 10, wherein when said roaming status is detected said at least one remote unit communicates said roaming status to said collector means.

13. The system recited in claim 12, wherein said collector means changes said identification data of said at least one remote unit to updated identification data.

14. The system recited in claim 13, wherein said updated identification data is determined by said relocation.

15. The system recited in claim 13, wherein said updated identification data is defined by a site identification number related to a region to which said at least one remote unit has relocated.

* * * * *